Patented Jan. 2, 1923.

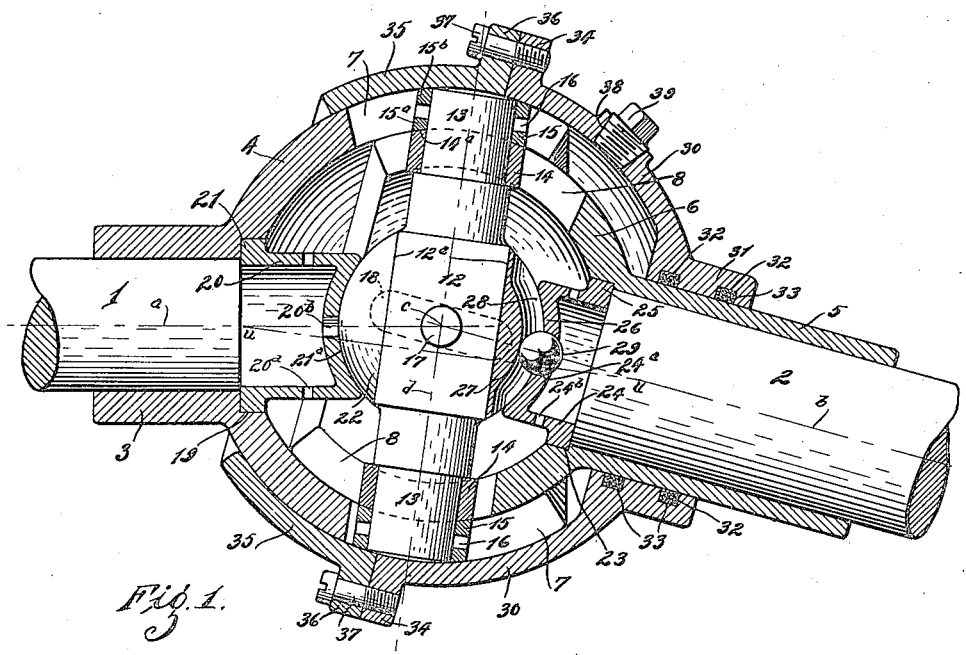

1,440,648

UNITED STATES PATENT OFFICE.

WILLIAM H. THIEMER, OF CLEVELAND, OHIO, ASSIGNOR TO THE PARAGON MACHINE TOOL & MANUFACTURING COMPANY, OF CLEVELAND, OHIO, A CORPORATION OF OHIO.

UNIVERSAL JOINT.

Application filed June 1, 1920. Serial No. 385,488.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to provide a construction of such joints that will enable a driven shaft, arranged at an angle to a driving shaft, to be driven constantly at the same speed as the latter shaft.

As is well known, in the ordinary type of metallic or rigid universal joint, where the driven shaft is arranged at an angle with respect to the driving shaft, the speed of the driven shaft varies through two maxima and minima during each rotation thereof. This change in velocity is rapid, occurring during each quarter revolution of the shaft. Where the driven shaft is arranged at an angle of 10° with respect to the driving or propeller shaft and the latter shaft is driven at a speed of 500 R. P. M., the maximum velocity of the driven shaft will be 508 and the minimum 492 R. P. M., making a variation of 16 R. P. M. during each quarter revolution. As the angle between the propeller or driving shaft and the driven shaft increases, the variation in speed is correspondingly increased. In the case of automobile transmission, this results, not only in increased friction upon the bearings of the universal joint, but in the imposition of severe strains upon the gears with which the driven shaft is connected and upon the fly wheel upon the propeller shaft.

Figure 3:
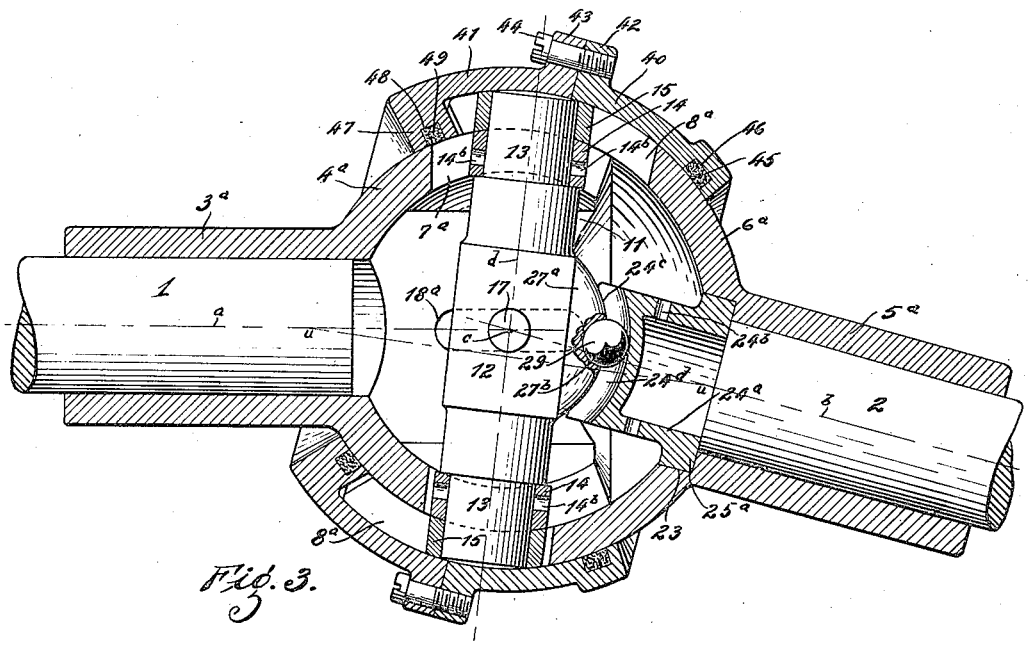

By my construction, I am enabled to couple two angularly disposed shafts by a metallic or rigid universal joint and at the same time to maintain a speed in the driven shaft which is equal at all times to that of the driving or propeller shaft. I accomplish these results in and through the construction shown in the drawings forming part hereof, wherein Fig. 1 represents a central longitudinal view taken through two angularly disposed shafts connected by my joint; Fig. 2 a sectional elevation of the joint shown in Fig. 1, showing the positions of the parts at the end of a quarter revolution of the shafts, the casing being broken away; Fig. 3 a view similar to Fig. 1, showing a modification of the invention disclosed in the former figure; and Fig. 4 a view similar to Figs. 1 and 3 and showing a still further modification of the invention.

Describing the parts by reference characters, 1 denotes the driving or propeller shaft and 2 the driven shaft, the two shafts being shown as having their axes $a$ and $b$ disposed at an angle of 15° with each other. Seated upon and secured to the shaft 1 is a hub 3, having a cup 4, the inner and outer surfaces of which are spherical and concentric with the point of intersection $c$ of the axes $a$ and $b$. Mounted on the shaft 2 is an elongated hub 5 having a cup 6, the inner and outer surfaces of which (with the exceptions to be noted hereinafter) are formed each as the segment of a sphere concentric with the point $c$. The cup 4 is provided with a pair of diametrically opposed slots 7 extending inwardly from the outer end thereof and the cup 6 is provided also with a pair of diametrically opposed slots 8 extending inwardly from the outer end thereof. In order to permit the cup 6 to be assembled within the cup 4, its outer surface is flattened at 9, midway between the slots 8, the inner surface also being flattened at 10, to preserve the thickness of the cup wall. In order to permit the cup 6 to be received within the cup 4, the metal on the inside of the outer end of said cup is cut away, as indicated at 11, in planes parallel to the axis $a$, midway between the slots 7. This will allow the cup 6 to be inserted within the cup 4 with the rounded or spherical parts thereof fitting within the flattened parts 11. When the cup 6 has once been entered, it may be given a quarter rotation, bringing the slots 8 into register with the slots 7. The cups serve as coupling members between the shafts 1 and 2.

The cups 6 and 4 are connected by a driver, indicated generally at 12, and having pins or trunnions 13. Each pin is mounted within a pair of square or rectangular bushing members, the inner member being indicated at 14 and the outer member being indicated at 15. Each inner member extends outwardly upon its trunnion pin as far as the outer edge of the slot 8, the outer end $14^a$ forming part of a spherical surface coinciding with the outer spherical surface of the cup 6. The inner end 15ª of the outer bushing member is also a portion of a spherical surface coinciding with the outer surface of the cup 6, and the outer end 15ᵇ of the outer bushing member 15 is formed as a spherical surface coinciding with the exterior surface of the cup 4 as well as the interior surface of the spherical casing (to be described hereinafter) which partially encloses the cups 4 and 6. Each outer bushing member 15 is provided with ports 16 through which lubricant from within the casing may be supplied by centrifugal action to the trunnions 13.

When desired, an anchoring cross pin 17 may be inserted through the driver 12, at right angles to the axis $d$ of the latter, the axis of the pin 17 being coincident with the intersection $c$ of the axes $a$ and $b$. The outer ends of the pin 17 extend through slots 18 in the cup 6 and are mounted in openings 18ª in the cup 4, the pin 17 being arranged at right angles to the axis of the shaft 1. This pin is not used for driving purposes, but facilitates the rocking of the driver about the point $c$. In Fig. 1, a line $u$—$u$ is shown as extending through the longitudinal axis $d$ of the driver 12 and intersecting the axes $a$ and $b$ at points equidistant from the point $c$. The longitudinal axis of the driver 12 is always at right angles to this line $u$—$u$ and always bisects the angle between the axes $a$ and $b$ of the shafts 1 and 2.

The hub 4 is provided at its inner end with an annular seat 19 for the reception of a thrust member comprising a cup 20 having a flange at 21 at its open end adapted to fit within said seat and a concave spherical end or bottom 21ª adapted to contact with the convex spherical surface of a shoe 22 slidably mounted upon one of the flat faces 12ª at the center of the driver. The cup is provided with openings 20ª and 20ᵇ for receiving lubricant inserted within the casing (to be described) and for supplying the same between the outer surface of said cup and the corresponding convex surface of the shoe 22.

The hub 5 is also provided with an annular seat 23 similar to the seat 19. A cup 24, similar to the cup 20, is provided with a flange 25 adapted to be received within said seat, and with a concave spherical surface 26 which is adapted to bear against the convex spherical surface of a shoe 27 slidably mounted upon one of the flat faces 12ª of the driver 12 opposite the shoe 22. The shoe 27 is similar to the shoe 22, but is provided with a groove 28 extending longitudinally of the driver and the bottom of which is concentric with the corresponding face 26 of the cup 24. The bottom or closed end of the cup 24 is provided with a central aperture 24ª for the reception of a ball 29 which, when seated, is adapted to thrust against the bottom of the slot 28. The cup 24 is also provided with apertures 24ᵇ for the reception of lubricant introduced within the casing, which will now be described.

The casing comprises a hemispherical cup member 30 having at one end a hub 31 adapted to surround the hub 5 and provided with packing rings 32 seated in annular grooves 33. The outer end of the cup member 30 is flanged, as indicated at 34, whereby it may be connected to a second cup member 35, also having a flange 36, as by means of bolts 37. The inner surface of the casing is spherical and is adapted to fit over the outer surface of the cup 4. An opening 38 and a plug 39 afford means for introducing lubricant into the casing, which lubricant will be supplied by centrifugal action to the openings 16, 20ª and 24ᵇ.

With the parts constructed and arranged as described, when power is applied to the shaft 1, it will be transmitted to the cup 4, bushings 15, pins 13, bushings 14 and cup 6. During the rotation of the shaft 1, the axis $d$ will always be at right angles to the line $u$—$u$, not only because this is the path of least resistance for the driver, but by reason of the thrust exerted against the driver on opposite sides of its center $c$ by the cups 20 and 24 and shoes 22 and 27. During such rotation, the shoes will slide along their face 12ª, due to the thrust of the cups 20 and 26, and ball 29, the ball thrusting against the sides of the groove 28 as the parts turn. The axis $d$ of the driver 12 will always be maintained at right angles to the line $u$—$u$, for reasons stated, and will also always bisect the exterior as well as the interior angle formed by the axes $a$ and $b$. As a result, the speed of the shaft 2 will be constant throughout each revolution thereof, provided that the speed of the drive shaft is constant and will always be the same as the speed of the drive shaft. Where the pin 17 is employed, the manner of mounting the same maintains it always at right angles to the driving or propeller shaft. The construction of the bushing members 14 and 15 allows them to rotate with respect to each other through the intersection or crossing of the slots 7 and 8—see Fig. 2.

During the rotation of the drive shaft 1, the driving connection between the said shaft and the driven shaft 2 is automatically varied throughout and during each rotation of said shaft, so as to secure a speed of the driven shaft which is at all times equal to that of the driving shaft, with a constant pressure upon the bearing parts.

In Fig. 3 there is shown a modification of the invention shown in the preceding views wherein the driving shaft 1 is provided with a hub 3ª having a cup 4ª which is adapted to fit within a cup 6ª having a hub 5ª mounted on the driven shaft 2. The driver pin 12 has trunnions 13 mounted in bushing members 14 and 15 similar to the bushing members shown in the preceding views, the bushing member 14 having opening 14ᵇ for lubricant. The bushing members are mounted in slots 7ª and 8ª in the cups 4ª and 6ª, respectively, and a cross pin 17 is shown as extending through the center of the axis of the driver pin and through slots 18ª in the cup 4ª, its ends being anchored in openings in the cup 6ª. The hub 3ª is provided with no cup corresponding to the cup 20, but the hub 5ª is provided with an annular seat 23 for the flange 25ª of the cup 24ª similar to the cup 24, and having lubricating apertures 24ᵇ. The outer surface 24ᶜ of the cup 24ª is shaped to conform to the convex surface of the shoe 27ª. This shoe is provided with a seat 27ᵇ for a ball 29 which is received within a groove 24ᵈ in the outer surface or bottom of the cup 24ª.

The overlapping ends of the cups 4ª and 6ª are covered by a casing comprising a pair of members 40 and 41 each being formed as a segment of a sphere and each having a flange, 42 and 43, respectively, by which the said members may be connected, as by bolts 44. The member 40 fits upon the outer enlarged end of the cup 6ª and is provided with a packing ring 45 seated within a recess 46 and bearing against the outer surface of said cup. The casing member 41 is provided with an annular flange 47 at its smaller end, the said flange having an annular recess 48 within which there is inserted a packing ring 49 adapted to bear against the outer surface of the cup 4ª. As is the case with the casing 30, 35, this casing serves to protect the working parts of the joint against the access of dust, etc., and to provide a receptacle for lubricant to the parts therewithin.

Figure 4:
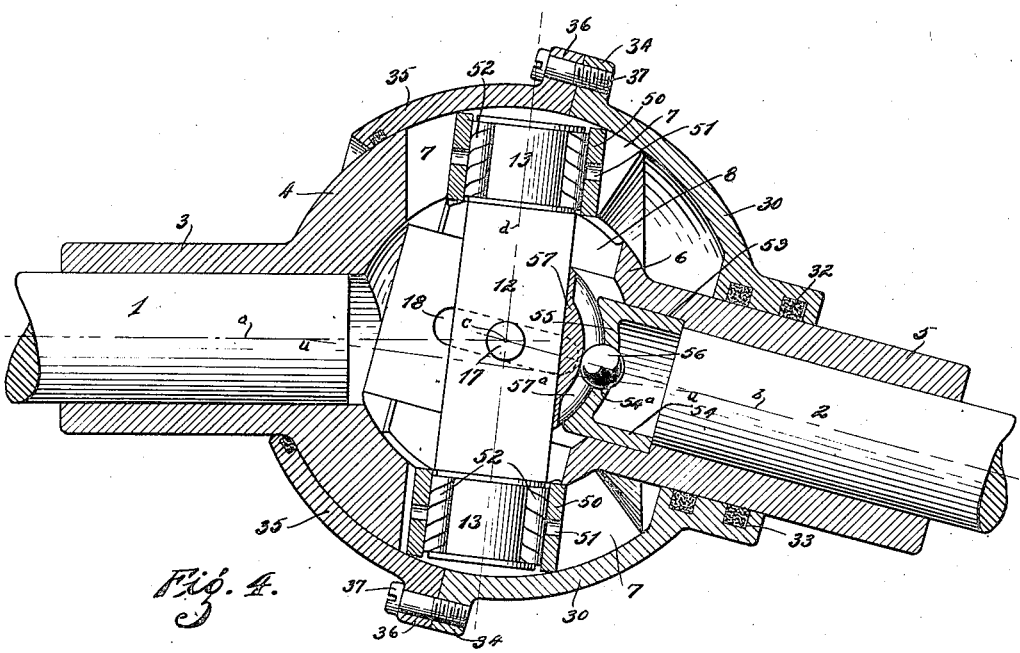

In Fig. 4 there is shown a still further modification of my invention, wherein the larger cup 4 is carried by the drive shaft 1 and the smaller cup 6 by the driven shaft 2. The driver 12 is provided with trunnions 13 which are mounted entirely within the slot 7 in the cup 4, the slots 8 being correspondingly widened to receive the body of the driver. Surrounding each trunnion 13 is a bushing 50 having lubricating openings 51. Within each bushing and surrounding the trunnion therein are helical spring rollers 52.

The inner end of the hub 5 is provided with an annular seat 53 for the reception of the open end of a cup 54 having a concave bottom 55 similar to the bottoms of the cups 24 and 24ª and provided with a seat 54ª for a ball 56, which cooperates with a groove 57ª in a shoe 57 similar to the shoe 27 of Fig. 1. Extending through the center of the axis of the driver 12 is a cross pins 17 the ends of which extend through slots 18 in the cup 6 and are anchored in apertures in the cup 4, as is the case in Figs. 1 and 2.

The cups 4 and 6 are provided with a casing substantially identical with that shown in Figs. 1 and 2 and the parts thereof are designated by the same reference characters as are employed with the casing in the former views.

The operation of the devices shown in Figs. 3 and 4 is substantially identical with that shown in Figs. 1 and 2, and they accomplish the same result of maintaining the driver 12 in the path of least resistance, with its axis continually bisecting the exterior and interior angles formed between the axes $a$ and $b$ and always at right angles to the line $u$—$u$.

Having thus described my invention, what I claim is:—

1. The combination, with a driving shaft and a driven shaft arranged angularly with respect thereto, of coupling members carried by the proximate ends of said shafts, respectively, a driver, a rocking connection between each end of said driver and said members, and a thrust device operatively connected with one of said shafts and cooperating with the driver to maintain the axis of the same at substantially right angles to a line extending through the axis of said driver, and interesecting the axes of said shaft at points equidistant from their point of intersection.

2. The combination, with a driving shaft and a driven shaft arranged angularly with respect thereto, of coupling members carried by the proximate ends of said shafts, respectively, a driver, a rocking connection between said driver and said members, and a thrust device operatively connected with one of said shafts and cooperating with the driver to maintain the latter in a predetermined path during the rotation of said shafts.

3. The combination, with a driving shaft and a driven shaft arranged angularly with respect thereto, of coupling members carried by the proximate ends of said shafts, respectively, a driver, a rocking connection between each end of said driver and said members, and a thrust device operatively connected with each of said shafts and cooperating with said driver to maintain the axis of the latter in a position constantly bisecting the angle between the axes of said shafts.

4. The combination, with a driving shaft and a driven shaft arranged angularly with respect thereto, of coupling members carried by the proximate ends of said shafts, respectively, a driver, a rocking connection between each end of said driver and said members, and a thrust device operatively connected with one of said shafts and cooperating with said driver to maintain the latter in a position wherein its axis will constantly bisect the angle between the axes of said shafts.

5. The combination, with a driving shaft and a driven shaft arranged angularly with respect thereto, of coupling members carried by the proximate ends of said shafts, respectively, a driver having a rocking connection between each end thereof and both of said members, a shoe member having a convex outer surface and slidably mounted on the central portion of said driver, a thrust member carried by one of said shafts and having a concave surface cooperating with the convex surface of said shoe, there being a groove formed in one of the two last mentioned members, and a ball mounted in the other of said last mentioned members and working within the said groove.

6. The combination, with a driving shaft and a driven shaft arranged angularly with respect thereto, of coupling members carried by the proximate ends of said shafts, respectively, a driver, rocking connections between the opposite ends of said driver and said members, shoes having convex outer surfaces and slidably mounted on opposed sides of the central portion of said driver, each of said shafts having an extension provided with a concave base adapted to cooperate with the convex surfaces of said shoes, respectively, and a thrust device interposed between one of such extensions and the shoe cooperating therewith.

7. The combination, with a driving shaft and a driven shaft arranged angularly with respect thereto, of coupling members carried by the proximate ends of said shafts, respectively, a driver, rocking connections between the opposite ends of said driver and said members, a shoe having a convex outer surface and slidably mounted on one side of the central portion of said driver, one of said shafts having an extension provided with a concave base adapted to cooperate with the convex surface of said shoe, and a thrust device interposed between such extension and the said shoe.

8. The combination, with a driving shaft and a driven shaft arranged angularly with respect thereto, of coupling members carried by the proximate ends of said shafts, respectively, a driver, rocking connections between the opposite ends of said driver and said members, shoes having convex outer surfaces and slidably mounted on opposite sides of the central portion of said driver, each of said shafts having an extension provided with a concave surface adapted to cooperate with the convex surface of a shoe, there being a groove interposed between one of said extensions and its shoe, and a ball within said groove, each of such extensions having one or more openings for the reception of lubricant.

9. The combination, with a driving shaft and a driven shaft arranged angularly with respect thereto, of coupling members carried by the proximate ends of said shafts, respectively, a driver rocking connections between the opposite ends of said driver and said members, a shoe having a convex outer surface and slidably mounted on one side of the central portion of said driver, one of said shafts having an extension provided with a concave surface adapted to cooperate with the convex surface of the shoe, there being a groove interposed between said extension and said shoe, and an anchored ball movable within said groove.

10. The combination, with a driving shaft and a driven shaft arranged angularly with respect thereto, of a coupling member carried by the driving shaft and having opposed slots, a coupling member carried by the driven shaft and having opposed slots adapted to register with the slots of the first mentioned member, a driver having a trunnion at each end thereof mounted in the slots of said coupling members, and a pair of bushing members on each trunnion, each member having a pair of faces adapted to engage the walls of the slots in said coupling members, respectively, the outer member of each pair of bushing members being rotatably mounted upon the inner member.

In testimony whereof, I hereunto affix my signature.

WILLIAM H. THIEMER.